United States Patent [19]
Martin et al.

[11] Patent Number: 5,140,332
[45] Date of Patent: Aug. 18, 1992

[54] SHORT PULSE RADAR SYSTEM WITH A LONG PULSE TRANSMITTER

[75] Inventors: Raymond G. Martin, Ellicott City; Gregory S. Hill, Columbia, both of Md.

[73] Assignee: Westinghouse Electric Corp., Pittsburgh, Pa.

[21] Appl. No.: 793,211

[22] Filed: Oct. 25, 1991

Related U.S. Application Data

[63] Continuation of Ser. No. 379,404, Jul. 13, 1989, abandoned.

[51] Int. Cl.$^5$ .................................................. G01S 13/28
[52] U.S. Cl. ...................................... 342/202; 342/201; 342/132; 342/134
[58] Field of Search ................ 342/204, 93, 132, 134, 342/201, 202

[56] References Cited

U.S. PATENT DOCUMENTS

| H484 | 6/1988 | Holliday | 342/201 |
|---|---|---|---|
| 3,968,490 | 7/1976 | Gestin . | |
| 4,053,884 | 10/1977 | Cantrell et al. | 342/93 |
| 4,096,478 | 6/1978 | Chavez | 342/109 |
| 4,099,182 | 7/1978 | Ward | 342/132 |
| 4,101,889 | 7/1978 | Evans | 342/93 |
| 4,136,341 | 1/1979 | Mulder et al. | 342/93 |
| 4,137,532 | 1/1979 | Taylor, Jr. et al. | 342/160 |
| 4,142,189 | 2/1979 | Gleason | 342/93 |
| 4,153,900 | 5/1979 | Novak et al. | 342/109 |
| 4,216,433 | 8/1980 | LeGrand | 328/111 |
| 4,293,856 | 10/1981 | Chressanthis et al. | 342/93 |
| 4,347,513 | 8/1982 | Schindler | 342/13 |
| 4,404,562 | 9/1983 | Kretschmer, Jr. et al. | 342/201 |
| 4,490,720 | 12/1984 | Kuntman | 342/195 |
| 4,524,361 | 6/1985 | Teulings | 342/201 |
| 4,562,438 | 12/1985 | Rouse et al. | 342/201 |
| 4,616,232 | 10/1986 | Reits | 342/379 |
| 4,620,112 | 10/1986 | McPherson et al. | 307/239 |
| 4,626,855 | 12/1986 | Rouse | 342/201 |
| 4,670,755 | 6/1987 | Gellekink et al. | 342/194 |
| 4,698,827 | 10/1987 | Kretschmer | 342/201 X |
| 4,719,468 | 1/1988 | Jehle et al. | 342/201 |
| 4,739,186 | 4/1988 | Crookshanks | 342/201 X |
| 4,839,655 | 6/1989 | Kiuchi | 342/93 |
| 4,847,624 | 7/1989 | Hopwood et al. | 342/201 |
| 4,875,050 | 10/1989 | Rathi | 342/195 |
| 4,885,590 | 12/1989 | Hasan | 342/196 |
| 4,894,660 | 1/1990 | Thomson et al. | 342/129 |
| 4,914,441 | 4/1990 | Brookner | 342/161 |
| 4,983,979 | 1/1991 | McKenzie | 342/204 |
| 5,036,328 | 7/1991 | Nakamura et al. | 342/204 |

Primary Examiner—John B. Sotomayor
Attorney, Agent, or Firm—John Williamson

[57] ABSTRACT

A radar system is disclosed which includes a transmitter which produces a long coded radar pulse. The return of the long coded radar pulse is compressed by a long pulse compression filter to produce a short coded pulse and the short coded pulse is compressed by a short pulse compression filter to produce a return pulse for processing by an existing processor designed to process return coded pulses of a particular format. The long pulse transmitter can also transmit a short coded precursor pulse, to improve radar range coverage, along with the long coded pulse by the provision of a switching bypass device which routes the short coded pulse return signal around the long pulse compression filter.

10 Claims, 3 Drawing Sheets

SHORT PULSE RADAR SYSTEM WITH A LONG PULSE TRANSMITTER

This application is a continuation of application Ser. No. 07/379,404, filed Jul. 13, 1989, now abandoned.

BACKGROUND OF THE INVENTION

1. Field of the Invention

The present application is directed to a radar system in which a solid-state, long radar pulse transmitter is used with a short coded pulse radar processor and, more particularly, to a system in which a long pulse compression filter is provided in the receiver to convert the long pulse into the short pulse expected by the signal processor allowing retrofit of existing radar systems with the more reliable solid-state transmitters or to the design of a system in which hard limiting constant false alarm rate processing is desired.

2. Description of the Related Art

Many existing radars, such as the TPS-70 available from Westinghouse, use tube transmitters to generate, and a processor designed to process, relatively short coded radar pulses. A pulse is generally considered a short pulse when the length is from around 1 to around 10 microseconds. However, there is increasing interest in modifying the short pulse designs to use solid-state transmitters for which long pulse transmissions are more appropriate, so that reliability can be increased while taking advantage of the particular capabilities of the short pulse systems. A pulse is generally considered a long pulse when the pulse length is greater than about 50 microseconds. Long pulse waveforms, as are appropriate to solid-state transmitters for long or medium range, low pulse repetition frequency, surveillance radars, typically are of sufficient length (for example, 100 microseconds or more) that the only waveforms which have sufficient doppler tolerance for the target radial speeds of interest are linear FM or some form of closely related non-linear FM. An exception may be low frequency, for example, VHF or UHF, radars, for which biphase or quadriphase long coded waveforms may have sufficient doppler tolerance. However, existing radars using tube transmitters typically use short coded pulse waveforms, such as the 6.5 microsecond quadriphase coded pulse used in the TPS-70 radar. These existing radars typically employ digital pulse compression by convolutional methods and, as in the TPS-70 case, also frequently take advantage of the waveform code structure to employ hard limiting type constant false alarm rate (CFAR) processing. A conventional approach to signal processing for long pulses, appropriate to solid-state transmitter type waveforms would likely involve major signal processor changes which possibly would include the incorporation of Fast Fourier Transform (FFT) - Inverse Fast Fourier Transform (IFFT) pulse compression producing a short unencoded pulse from the long encoded pulse and cell averaging CFAR into the processor algorithms.

SUMMARY OF THE INVENTION

It is an object of the present invention to use solid-state transmitters in short pulse radar systems.

It is another object of the present invention to allow existing radar systems to be retrofitted with solid-state transmitters.

It is an additional object of the present invention to provide a more reliable radar system.

It is a further object of the present invention to provide a system which will operate with both long and short radar pulses.

It is also an object of the present invention to provide a long pulse system that is capable of using constant false alarm rate processing.

It is an object of the present invention to provide short range coverage in a long pulse system.

The above objects can be attained by a system in which a solid-state, long pulse radar transmitter is provided along with both a long pulse conversion filter and a short pulse compression filter in the receiver. The long pulse filter converts a long return pulse into the shorter pulse expected by the short pulse compression filter and existing processor. To allow both long and short pulses to be used a bypass switch is provided to route short return pulses around the long pulse filter.

These together with other objects and advantages which will be subsequently apparent, reside in the details of the construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
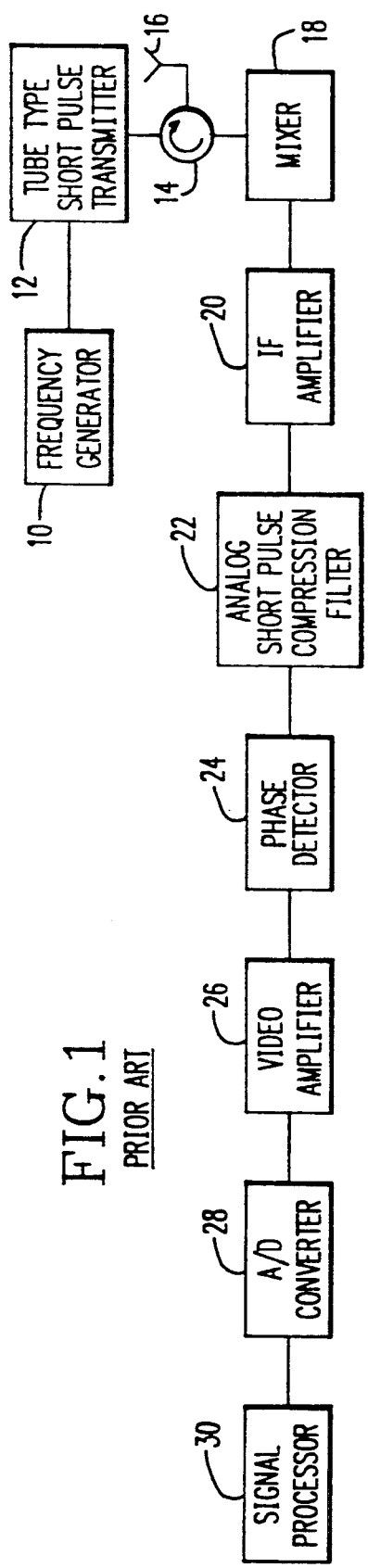
FIG. 1 illustrates a conventional radar system using a tube type, short pulse transmitter 12.

Prior to discussion of the operation and structure of the present invention, the components of a conventional radar system that uses a short pulse will be discussed with respect to FIG. 1. A conventional frequency generator 10 produces a short coded waveform specified by the system designer which is amplified and output by the tube type, short pulse transmitter 12. A duplexer 14 applies the signal to an antenna 16 which broadcasts the signal toward a target. The signal reflected from the target impinges on the antenna 16 and is routed to a conventional mixer 18 which conventionally uses a local oscillator to demodulate the received signal. An IF amplifier 20 applies the demodulated signal to a conventional analog short pulse compression filter 22, such as a surface acoustic wave filter, which is designed to convert the return pulse which is typically approximately 6.5 microseconds long to a pulse which is 0.5 microseconds long, a 13 to 1 compression ratio. The compressed pulse is then applied to a conventional phase detector 24 and video amplifier 26 and then converted into a digital signal sample by an analog-to-digital converter 28. A signal processor 30 performs conventional signal processing on the digitized signal and provides a radar indication, that is, a display or target location information.

Equivalently, the pulse compression function of filter 22 could be accomplished digitally, in which case the digital compression function would typically be performed after the signal processing function and the analog short pulse compression filter would be omitted. The reason for performing the final pulse compression after the signal processing function is that a non-linear type of pulse compression known as Coded Pulse Anti-Clutter System (CPACS) available from Westinghouse provides an economical way to combine the pulse compression with a CFAR processing function and, because CPACS processing is non-linear in nature, it must be placed after the linear signal processing function, otherwise it would degrade the performance of such typical signal processor Doppler processing functions as Moving Target Indicator (MTI) processing that are used to remove or reduce the effects of ground clutter return signals.

The basic idea of the present invention is to transmit a linear FM, non-linear FM chirp, or other coded long pulse of a bandwidth corresponding to the range resolution of the digital signal processor 30 and to employ a filter (for example, a surface acoustic wave device) in the receive chain to convert the received signal that would return from a point target into a second and different specific coded waveform for which the signal processor 30 is designed. For example, for the TPS-70 signal processor, the desired converted received signal would be a 6.5 microsecond quadriphase coded pulse (a complex pulse with coding of the internal structure of an individual pulse), regardless of the length and coding of the actual transmitted pulse. In the conversion of the transmitted pulse to the second pulse range side lobes will exist on the second coded pulse output of the long pulse compression filter, however, the transmitted pulse filter can be designed to drive these side lobes to almost any desired level with respect to the desired coded output pulse using well known mismatched filter design techniques. The following discussion assumes that a chirp pulse preferably 130 microseconds long is being transmitted, although it will be recognized by those of ordinary the art that other long coded pulse waveforms could be used in low frequency radars for which such codes have sufficient doppler tolerance for the range of the target radial speeds of interest. The following discussion will, for the purpose of simplicity, also discuss the filtering of the present invention as a series combination of two filters when the filter designer of ordinary skill would likely produce a single filter with an equivalent response of the cascaded filters.

Figure 2:
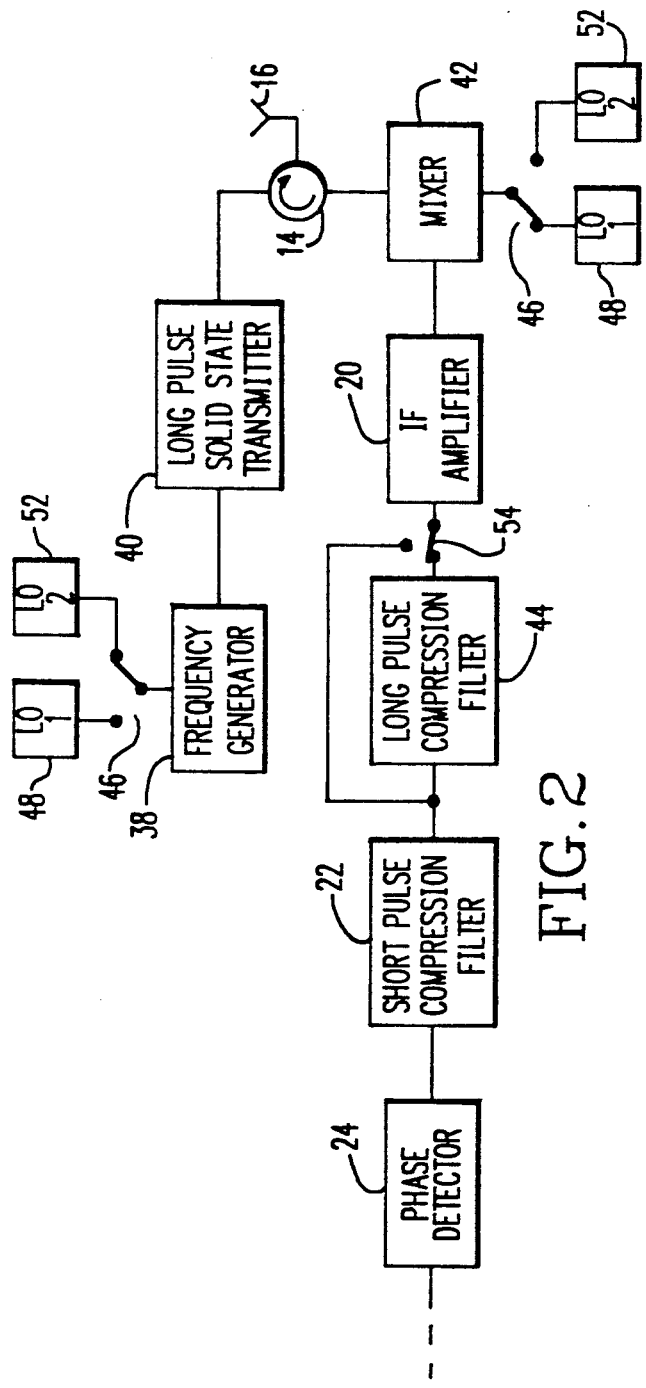
FIG. 2 illustrates a radar system with a long pulse, solid-state transmitter 40 in accordance with the present invention.
Figure 2A:
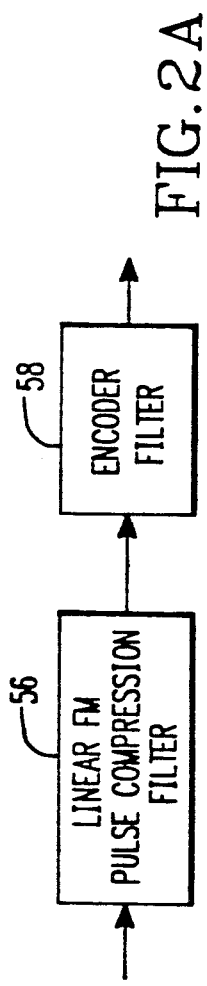
FIG. 2A illustrates the components of filter 44 in FIG. 2.

As illustrated in FIG. 2, as an example of one possible implementation of the invention, a conventional frequency generator 38 generates the desired long coded pulse and provides the pulse to a conventional long pulse, solid-state transmitter 40. As in the conventional system described with respect to FIG. 1, the pulse is transmitted through a duplexer 14 and antenna 16 to be reflected off the target and demodulated by a conventional mixer 42 and conventional IF amplifier 20. The return signal is then applied to a long pulse compression filter 44 designed to compress the return signal to the form expected by the conventional short pulse compression filter 22. For example, the filter 44 would compress a 130 microsecond 2 megahertz bandwidth FM chirp return pulse to a 6.5 microsecond pulse. The short pulse compression filter 22 supplies the signal to the phase detector 24 and thereon to the signal processor 30. To illustrate the design features that must be incorporated in filter 44, it is convenient to implementation of filter 44 to describe filter 44 as a series combination of two separate filters. As illustrated in FIG. 2A, the first of these two filters is a conventional pulse compression filter 56 for the transmitted pulse, and for the above example of a transmitted wave form consisting of a 2 megahertz bandwidth linear FM chirp, the pulse compression filter 56 would convert the 130 microsecond return signal into a compressed pulse of approximately 0.5 microseconds in length. The second of the two filters 58 is a conventional encoder filter having an impulse response such that when excited by a 0.5 microsecond pulse produces an output waveform 6.5 microseconds in length encoded with the phase code expected by the short pulse compression filter (the internal structure of the pulse) 22. Since the present invention is using linear filters, the same result can be obtained if the two filters 56 and 58 are cascaded in reverse order or if a single filter is formed having equivalent response characteristics.

Design methods are well known for chirp or other coded pulse compression filters such as the pulse compression filter 44 which have controlled range lobe characteristics. To obtain either a single long pulse compression filter 56 or a combined filter which performs the functions of filters 56 and 58, the radar system architect provides a description of the coded 6.5 microsecond pulse and the desired long pulse to a filter designer of ordinary skill who uses a conventional filter design program to produce the layout of an analog filter, such as a surface acoustic wave (SAW) filter for pulses less than 100 microseconds in length and a reflective dot array SAW filter for longer pulse lengths, which will perform the functions of either filter 56 or the combination of filters 56 and 58. Appropriate SAW filters can be obtained from Westinghouse or Racal-Mesl of Scotland.

Because monostatic radars are normally unable to receive while they are transmitting, they are generally unable to respond to targets at ranges shorter than that corresponding to a round trip time equivalent to the transmitted pulse length (for example 8 miles in the case of a 100 microsecond pulse). Because the receiver must be turned off while the long pulse is being transmitted, the range of the radar system retrofitted with a solid-state transmitter 40 is changed as compared to the range of the short pulse system with the tube the transmitter 12. That is, the mixer 42 can be turned on earlier in a short pulse system and, thus, a short pulse radar system is capable of detecting and tracking targets that are closer to the antenna 16.

To overcome the above-discussed drawback and allow operation at shorter ranges, a second embodiment of the present invention also illustrated in FIG. 2 can be used to transmit a short precursor pulse of one frequency followed by a long pulse of a different frequency. In this modified system during short pulse transmission a switch 46 connects a local oscillator 48 of a first frequency to the generator 38 to produce a short pulse of a corresponding frequency. As soon as the pulse has been transmitted the mixer 42 is activated and uses the same frequency generator 38 to demodulate the return signal. During the receive period for the returns of the short pulse, switch 54 is set to route the short pulse returns around the long pulse compression filter 44. Once the time period for the desired range of the short pulse has expired, the switch 46 is toggled to a local oscillator 52 which causes the frequency generator 38 and transmitter 40 to produce a long pulse. At the same time the switch 46 applies the same long pulse local oscillator signal to the mixer 42. During receipt of the long pulse the switch 54 is set to pass the return signal to the long pulse compression filter 44. The same solid-state transmitter 40 can be used for both the short pulse and the long pulse because the energy content of the short range pulse, even though lower than the long pulse, is sufficient to provide coverage for the limited range extent for which it is required. The energy of the short and long pulses should be selected so that the returns are within the maximum range of the receive circuits such as by making the peak power of the pulses the same. The benefit of this approach of transmitting a short precursor pulse, prior to the transmission of each long pulse, using different transmit frequencies for the short precursor and long chirp pulses, and encoding the precursor pulse with the short pulse waveform expected by the signal processor 30 is that the long pulse system can be supplemented in a low cost manner to provide short range coverage in ranges less than are normally achievable with long pulse transmissions.

Although not shown in FIG. 2, it is possible to have separate dedicated receive chains for the long and short return pulses. With this approach the long and short pulses can be transmitted in direct sequence with no inter-pulse delay. This is not a preferred approach because of the increased cost of component duplication.

Figure 3:
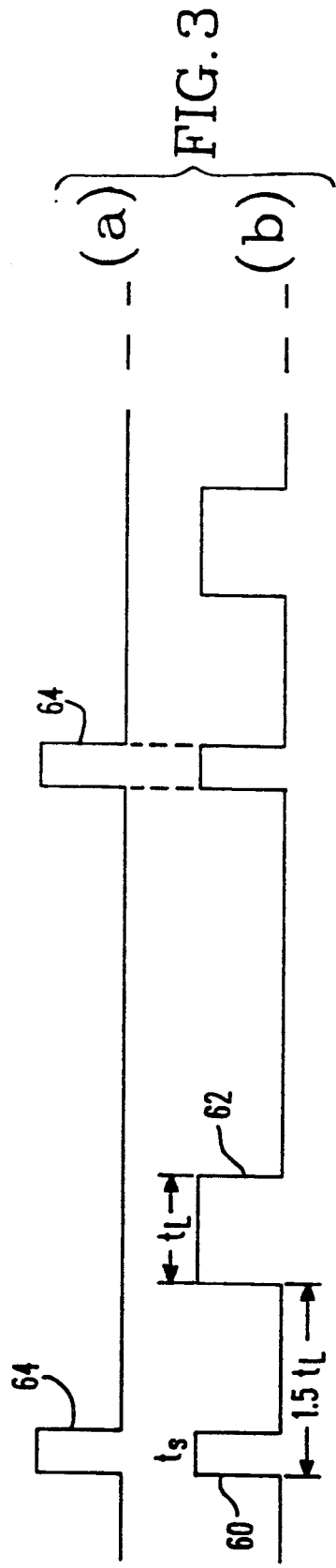
FIGS. 3a and 3b compare the radar pulse sequence of the systems of FIG. 1 and FIG. 2.

In a ground based dual pulse, single chain system it is preferred that the precursor pulse be transmitted with a sufficiently long receive time interval between it and the long pulse so that the receiver can be activated to respond to targets at all the ranges of interest shorter than the minimum range response achievable by the long pulse. This interval between the short 60 and long 62 pulse signals for a ground based radar is illustrated in FIG. 3(b). This interval, if set, for example, at 1.5 times the width of the long pulse 62, will allow clutter which is very close to the receiver to be dealt with by receivers of reasonable dynamic range. FIG. 3(a) illustrates the short pulse transmission sequence of the conventional system illustrated in FIG. 1. As can be seen by comparing FIG. 3(a) and FIG. 3(b) the present invention provides the same range coverage as a typical short pulse system.

Figure 4:
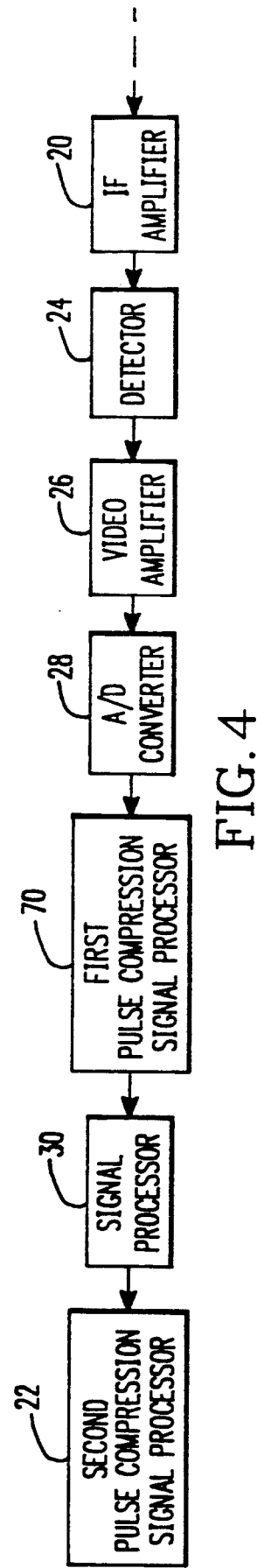
FIG. 4 illustrates the components of a digital embodiment of the system illustrated in FIG. 2.

As previously mentioned, the present invention can be incorporated into a pulse compression digital signal processor 70 separate from the processor 30, as illustrated in FIG. 4. In this embodiment the second pulse compression function 22 is performed digitally after the signal processor function 30 as would be appropriate for incorporation of CPACS processing in the manner previously described, and the pulse compression function of filter 44 is moved from in between the IF amplifier 20 and detector 24 to in between the analog-to-digital converter 28 and the signal processor 30. By providing the pulse compression signal processor 70 as a processor separate from the signal processor 30 the changes necessary in the radar system to incorporate the solid-state transmitter 40 are once again kept to a minimum. However, as will be recognized by those of ordinary skill in the art, the processing performed by the pulse compression digital signal processor 70 can be incorporated into the signal processor 30. The processing performed by the pulse compression signal processor 70 can be performed in the frequency domain or in the time domain where the frequency domain is preferred because of current technological processing constraints.

Figure 5:
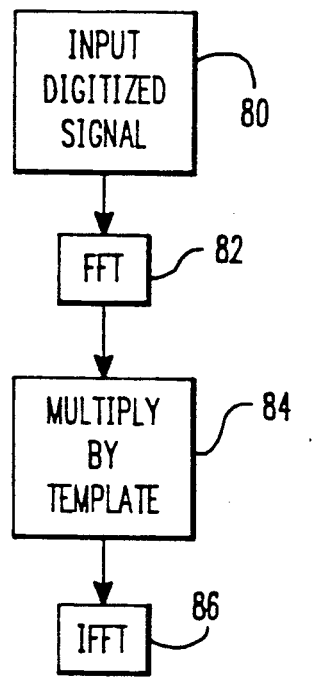
FIG. 5 illustrates the signal processing performed by the pulse compression signal processor 70 of FIG. 4 in the frequency domain.

FIG. 5 illustrates the processing done in the frequency domain either in the separate processor 70 or as a filtering algorithm in the processor 30 and is equivalent to performing a convolution in the time domain. Once the entire incoming return signal (a range sweep) is digitized 80, a conventional FFT 82 is performed on the digitized signal. The digitized signal transformed into the frequency domain is multiplied 84 by a template which is a stored replica of the FFT of the impulse response of the desired filter 44. The template multiplied transformed signal is then subjected to an IFFT 86 to produce the compressed coded return pulse expected by the signal processor 30. The template can be prepared by one of ordinary skill in the digital filter design art and the transform algorithms for the FFT and IFFT are well known and readily available.

Figure 6:
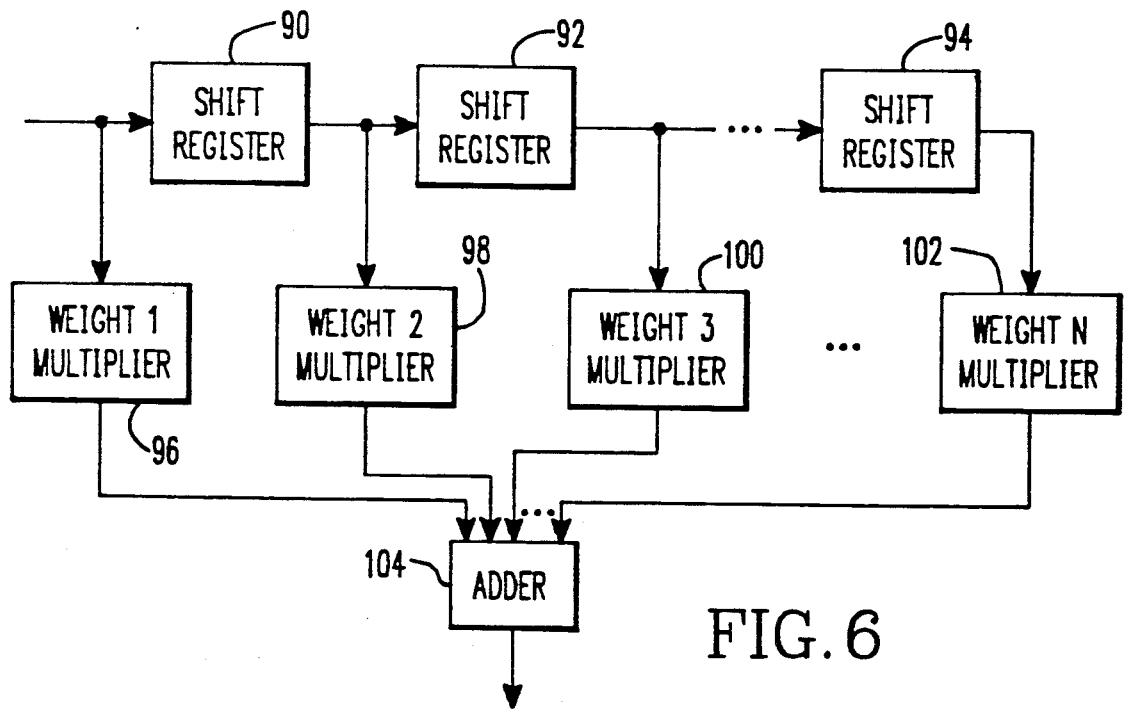
FIG. 6 illustrates the components necessary for processing the radar signal by a discrete component pulse compression signal processor 70 as illustrated in FIG. 4 in the time domain.

When the filter processing is performed in the time domain the functions of the processor 70 or of the routine for the processing incorporated into the signal processor 30 are illustrated in FIG. 6. FIG. 6 also illustrates the hardware components necessary to perform the functions of the processor 70 using discrete components. The digital representations of the incoming signal (samples) produced by the A/D converter 28 are shifted through shift register stages 90-94 as each sample of the incoming signal is produced. The shift clock or delay provided by each stage is governed by the sample frequency of the A/D converter 28, for example a 100 microsecond pulse sampled at 2 megahertz would require 200 registers. The input signal and the outputs of the shift registers are multiplied, simultaneously if a discrete component device is produced or sequentially if done by a computer, by corresponding weight multipliers 96-102 and then combined by adder 104. The weights used by the multipliers 96-102 can be determined by a digital filter designer of ordinary skill from the characteristics of the long and short pulses provided by the radar system designer using a conventional filter design software package.

Even though the present invention is designed to retrofit existing radars with a solid-state transmitter, the present invention is applicable to new radar systems, since it is useful to transmit a long chirp type or otherwise encoded waveform and use a signal processor designed to work with a different, shorter coded pulse to provide the ability, to economically use a CPACS type CFAR in the signal processor 30 and to reduce the dynamic range requirement of the A/D converter 28 preceding the digital signal processor 30. This architecture provides a specific advantage in new systems because hard limiting CFAR is not effective for long pulses against clutter interference background, because such clutter is typically non-homogeneous over range extents corresponding to the typical long pulse lengths, but homogeneous over the short pulse length. The present invention also helps control the transmitted spectrum of the radar because the linear FM chirp or related waveform has better spectral confinement properties than a biphase or otherwise coded waveform of the same bandwidth. The present invention allows the transmitter waveform to be converted to a biphase or otherwise coded pulse for the receiver and allows use of the signal processor approach appropriate to the converted waveform. In such an application the transmitted and converted waveforms could be of greater, smaller or equal lengths.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

We claim:

1. A radar system, comprising:
   a long pulse transmitter transmitting a long encoded transmit pulse, having a first coded internal structure, to produce a long pulse return signal;
   first pulse filtering means for compressing the long pulse return signal into a short coded return pulse which is shorter than the long pulse return signal, and having a second coded internal structure different than the first coded internal structure of the long encoded transmit pulse;
   second pulse filtering means for compressing the short coded return pulse; and
   signal processing means for processing the compressed coded return pulse to produce a radar indication.

2. A radar system as recited in claim 1, wherein said first pulse filtering means comprises a surface acoustic wave filter.

3. A radar system as recited in claim 1, further comprising processing means for performing hard limiting constant false alarm rate processing of the coded return pulse.

4. A radar system as recited in claim 1, wherein said first and second pulse filtering means comprise one of a frequency domain digital filter, a time domain digital filter and a combination of a frequency domain digital filter and a time domain digital filter.

5. A radar system as recited in claim 1, further comprising:
   precursor means for causing said transmitter to transmit a short encoded precursor pulse associated with the encoded transmit pulse to produce a short encoded precursor return signal; and
   bypass means for applying the short encoded pulse precursor return signal to said second pulse filtering means and bypassing the said first pulse filtering means.

6. A radar system as recited in claim 5, wherein the short encoded precursor pulse if transmitted ahead of the encoded transmit pulse by a least the length of the encoded transmit pulse.

7. A radar system as recited in claim 5, wherein the short encoded precursor pulse has a first frequency and the encoded transmit pulse has a second frequency different from the first frequency and the short encoded precursor pulse and the encoded transmit pulse are transmitted concurrently.

8. A radar system, comprising:
   a long pulse transmitter transmitting a long encoded transmit pulse, having a first coded internal structure, to produce a long return signal;
   first pulse filtering means for compressing the long return signal into a short coded return pulse shorter than the long return signal, and having a second coded internal structure different than the first coded internal structure of the encoded transmit pulse;
   signal processing means for performing hard limiting constant false alarm rate processing on the short coded return pulse; and
   second pulse filtering means for compressing the hard limited false alarm rate processed short coded return pulse.

9. A radar system, comprising:
   a signal processor for compressing a short coded return pulse of a predetermined format having a first internal coded structure to produce a radar indication;
   a transmitter for producing a long encoded pulse having a second internal coded structure different than the first internal coded structure of said short coded return pulse and having a first length longer than a second length of said short coded return pulse; and
   processing means for compressing a returned long encoded pulse into the short coded return pulse of the predetermined format.

10. A radar system, comprising:
    a transmitter producing a first short coded pulse in association with a long coded pulse to produce a first short coded return pulse and a long coded return pulse where the first short coded pulse has a first internal coded structure different than a second internal coded structure of the long coded pulse and the first short coded return pulse has a first length shorter than a second length of the long coded return pulse;
    a long pulse compression filter compressing the long coded return pulse into a second short coded return pulse having the encoding of the first short coded pulse;
    switching means for switching the first short coded return pulse to bypass said long pulse compression filter;
    a short pulse compression filter compressing the first and second short coded return pulses; and
    a signal processor processing the first and second compressed short coded return pulses to produce a radar indication.

* * * * *